US008371327B2

(12) United States Patent
Lebreux

(10) Patent No.: US 8,371,327 B2
(45) Date of Patent: Feb. 12, 2013

(54) LIQUID DISTRIBUTOR IN PRESSURIZED FLUID SYSTEM

(75) Inventor: Uldege Lebreux, Mascouche (CA)

(73) Assignee: Productions DR, Salaberry-de-Valleyfield, Quebec (CA)

( * ) Notice: Subject to any disclaimer, the term of this patent is extended or adjusted under 35 U.S.C. 154(b) by 809 days.

(21) Appl. No.: 12/593,161

(22) PCT Filed: Mar. 25, 2008

(86) PCT No.: PCT/CA2008/000576
§ 371 (c)(1),
(2), (4) Date: Sep. 25, 2009

(87) PCT Pub. No.: WO2008/116313
PCT Pub. Date: Oct. 2, 2008

(65) Prior Publication Data
US 2010/0116357 A1    May 13, 2010

(30) Foreign Application Priority Data

Mar. 26, 2007   (GB) .................................. 0705684.9

(51) Int. Cl.
    *E03D 9/03*    (2006.01)
(52) U.S. Cl. .......................... 137/205.5; 137/883; 303/1
(58) Field of Classification Search .............. 137/205.5, 137/268, 564.5, 883; 55/DIG. 17; 303/1, 303/127, 128
    See application file for complete search history.

(56) References Cited

U.S. PATENT DOCUMENTS

| 337,408 | A | * | 3/1886 | Kearns ........................... 138/34 |
| 1,336,905 | A |   | 4/1920 | Hunzicker |
| 1,702,972 | A | * | 2/1929 | Larsen ......................... 137/269 |
| 3,384,103 | A | * | 5/1968 | Lansky ....................... 137/205.5 |
| 3,439,777 | A | * | 4/1969 | Gothberg ..................... 184/55.2 |
| 3,515,676 | A | * | 6/1970 | Hierta et al. ................. 261/78.2 |
| 4,723,967 | A | * | 2/1988 | Tom ................................ 95/90 |
| 4,804,013 | A |   | 2/1989 | Wilson |
| 5,150,822 | A | * | 9/1992 | Eitner et al. ............... 222/145.1 |
| 5,293,904 | A |   | 3/1994 | Wood |
| 6,391,098 | B1 | * | 5/2002 | Thomas ......................... 96/111 |
| 6,679,484 | B2 | * | 1/2004 | Hattori ........................ 261/64.1 |
| 6,701,953 | B2 | * | 3/2004 | Agosta ......................... 137/268 |
| 6,779,548 | B2 | * | 8/2004 | McKeary ................... 137/205.5 |
| 6,858,066 | B2 |   | 2/2005 | Quinn |
| 7,530,404 | B2 | * | 5/2009 | Lenz, Jr. ........................ 169/24 |

FOREIGN PATENT DOCUMENTS

WO    2004098969 A1    11/2004

* cited by examiner

*Primary Examiner* — Craig Schneider
*Assistant Examiner* — Matthew W Jellett
(74) *Attorney, Agent, or Firm* — Klauber & Jackson LLC

(57) ABSTRACT

A liquid distributor for distributing a liquid in a pressurized system, including an inlet line and a first outlet line for respectively supplying a pressurized fluid to the liquid distributor and receiving the pressurized fluid from the liquid distributor. The liquid distributor having a first container defining a first chamber with an aperture leading into the first chamber and a second container defining a second chamber, with an inlet port connectable to the inlet line and a first outlet port connectable to the first outlet line. A check valve is provided between the first and second chambers, operable between an open configuration. The check valve closing when a pressure inside the second chamber is larger than a pressure inside the first chamber by a predetermined pressure differential.

15 Claims, 5 Drawing Sheets

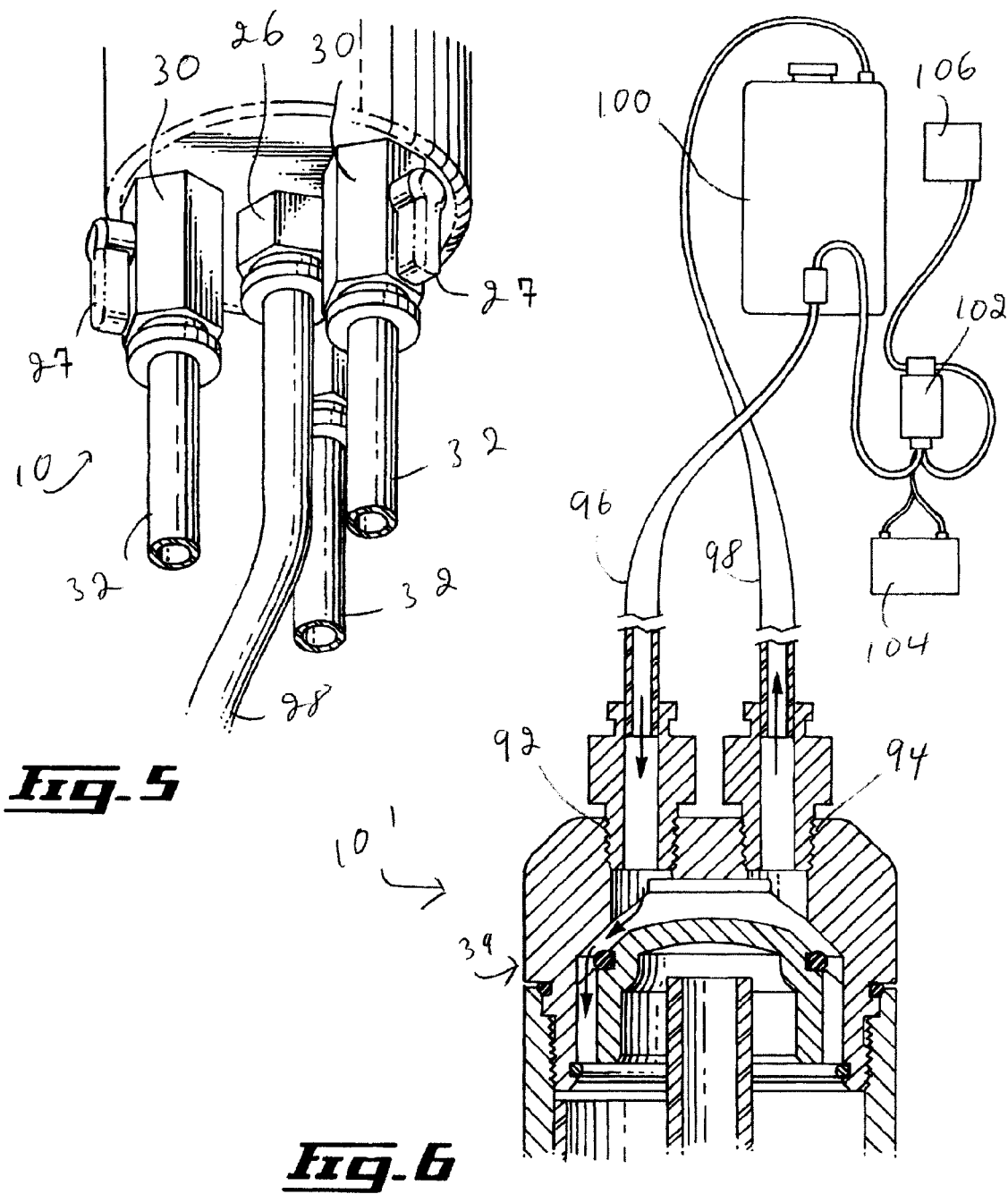

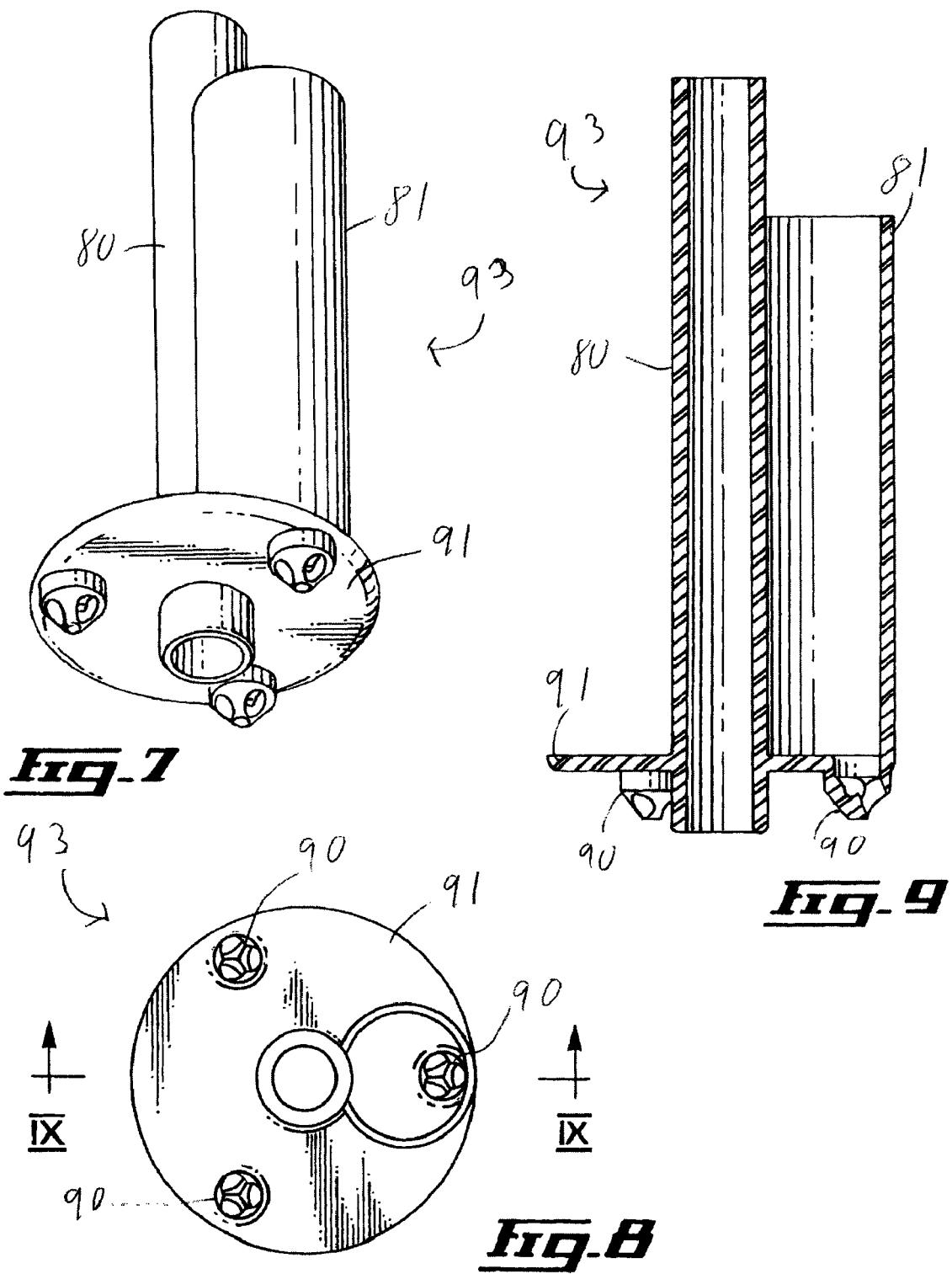

LIQUID DISTRIBUTOR IN PRESSURIZED FLUID SYSTEM

FIELD OF THE INVENTION

The present invention relates generally to the maintenance of fluid pressurized systems and, more particularly, to in-line distributors for dispensing a maintenance liquid in such systems.

BACKGROUND OF THE INVENTION

In-line maintenance liquid distributors for fluid pressurized systems are known in the art and are used, for example, for thawing out frozen air lines in compressed air systems, such as air brake, air dryer and/or pressured air tank systems generally found on tractor trailers, public busses, train cars and the like, as well as in stationary industrial applications. Clogged air lines often occur in fluid pressurized systems exposed to freezing temperatures due to the accumulation of moisture which condenses into water within the supply lines and air-operated devices in the system. Such liquid distributors of the prior art generally comprise a main reservoir or storage tank provided with an inlet port, an outlet port and a screw on lid through which a maintenance liquid, such as an alcohol based liquid, or the like, can be poured in to fill the tank. The ports are provided with fittings for engagement between the air supply lines and the network of air operated devices.

In use, in a typical application such as an air brake system on a vehicle, an alcohol based maintenance liquid in the distributor is dispensed throughout the fluid pressurized system, thus thawing and removing any accumulated ice deposits. Preventive maintenance can be achieved by adding an alcohol based maintenance liquid in the liquid distributor at regular intervals, which flushes away any accumulated moisture in the system, thus avoiding the possibility of dangerous brake failure due to ice up.

Typical prior art devices are, for example, U.S. Pat. No. 4,804,013, to Wilson (issued Feb. 14, 1989), U.S. Pat. No. 5,293,904, to Wood (issued Mar. 15, 1994) and U.S. Pat. No. 1,336,905, to Hunzicker (issued Apr. 13, 1920).

While these prior art devices can generally fulfill the main objective of distributing a maintenance liquid into a fluid pressurized system, they also offer one, or more, of the following disadvantages:
a) the operator has to release the fluid pressure from the system, prior to filling up the distributor with a maintenance liquid;
b) it is usually not possible to select a specific section of the fluid pressure system in which a maintenance liquid would be most effective to solve, for example, a fluid line clogged with ice deposits;
c) they generally comprise a bulky reservoir that cannot be conveniently installed, for example, within the cab of a tractor trailer or in a confined space within a fluid pressure system of a stationary industrial application.

Against this background, there exists a need for a new and improved liquid distributor. It is a general object of the present invention to provide such a liquid distributor.

SUMMARY OF THE INVENTION

In a first broad aspect, the invention provides a liquid distributor for distributing a liquid in a pressurized system, the pressurized system including an inlet line and a first outlet line for respectively supplying a pressurized fluid to the liquid distributor and receiving the pressurized fluid from the liquid distributor. The liquid distributor comprises:
a first container, the first container defining a first chamber and an aperture leading into the first chamber;
a second container, the second container defining a second chamber, an inlet port connectable to the inlet line and a first outlet port connectable to the first outlet line, the inlet and first outlet ports both being in fluid communication with the second chamber; and
a check valve provided between the first and second chambers, the check valve being operable between an open configuration in which the first and second chambers are in fluid communication with each other and a closed configuration in which the first and second chambers are substantially hermetically sealed from each other, the check valve achieving the closed configuration when a pressure inside the second chamber is larger than a pressure inside the first chamber by a predetermined pressure differential.

In some embodiments of the invention, the liquid distributor is substantially defined by a substantially vertically standing cylindrical container having a screw on cap closing the upper end thereof, and a closed bottom end provided with a plurality of screw-threaded pipe connections. Among these pipe connections, a first centrally disposed connection is for connecting the pressurized fluid inlet line originating from the output of a fluid compressor, while all the others, which are generally equidistantly disposed around the inlet line, are outlet lines linked to various elements requiring a compressed fluid such as, for example, an air brake, an air dryer and/or an air reservoir system installed on a tractor trailer, or the like. Typically, the outlet lines are each individually connected to the pipe connections at the bottom end of the main container through a manually operated valve for isolating selected outlet lines as desired.

The main container defines the first and second containers and is therefore generally divided into an upper chamber and a lower chamber that are communicating through the check valve. The purpose of the check valve is as follows: when there is no pressurized fluid in the second, or lower, chamber, the check valve element is in the open configuration and allows, if present, a maintenance liquid to flow from the first, or upper, chamber into the second chamber. When a pressurized fluid is introduced in the second chamber through the inlet supply port, the check valve element is moved to the closed configuration, thus sealing shut the first and second chambers from one another.

To use the liquid distributor, installed in line with a fluid pressurized system, an operator can remove the screw on cap and pour a specified amount of a maintenance liquid in the first chamber of the container, independently of whether there is, or not, a pressurized fluid in the second chamber. After having put the cap back on the first chamber, the operator can repeatedly apply and release the fluid pressure a predetermined number of times within the second chamber to allow the maintenance liquid to be distributed throughout the fluid pressurized system. For example, on a tractor trailer equipped with air brakes, an air dryer and an air reservoir, the operator simply has to apply and release the brakes about five to ten times to allow the maintenance liquid present in the upper chamber of the liquid distributor to flow into the lower chamber and, from there, be distributed throughout the system. Under specific conditions, such as when the fluid pressurized system is clogged with ice deposits, it may require repeated sessions of the same procedure. By closing the manual valve on selected outlet lines, the maintenance liquid can be distributed solely towards a targeted section of the fluid pressurized system.

Some advantages of the proposed liquid distributor reside in the ability to provide, in some embodiments of the invention, a liquid distributor:

a) which allows an operator to safely add a maintenance liquid to the fluid pressurized system, whether there is or not a fluid pressure in the system;

b) which allows the selection of a specific section of the fluid pressurized system into which a maintenance liquid should be distributed;

c) whose relatively compact format allows for its convenient installation inside the cab of a conventional tractor, or in any industrial application where space is limited;

d) which is simple in construction and economical to produce;

e) which is relatively safe to operate as the check valve ensures that the first chamber remains substantially unpressurized, whether the fluid pressurized system is pressurized or not.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the drawings,

FIG. 5: is a partial perspective view of an alternative embodiment of the liquid distributor according to the present invention;

FIG. 6: is a partial side cross-sectional view of another alternative embodiment of the liquid distributor according to the present invention;

FIG. 7: is a perspective view with parts removed of the liquid distributor of FIG. 5;

FIG. 8: is a bottom plan view with parts removed of the liquid distributor of FIG. 5; and FIG. 9: is a side cross-sectional view with parts removed of the liquid distributor of FIG. 5 taken along the line IX-IX of FIG. 8.

DETAILED DESCRIPTION

Figure 1:
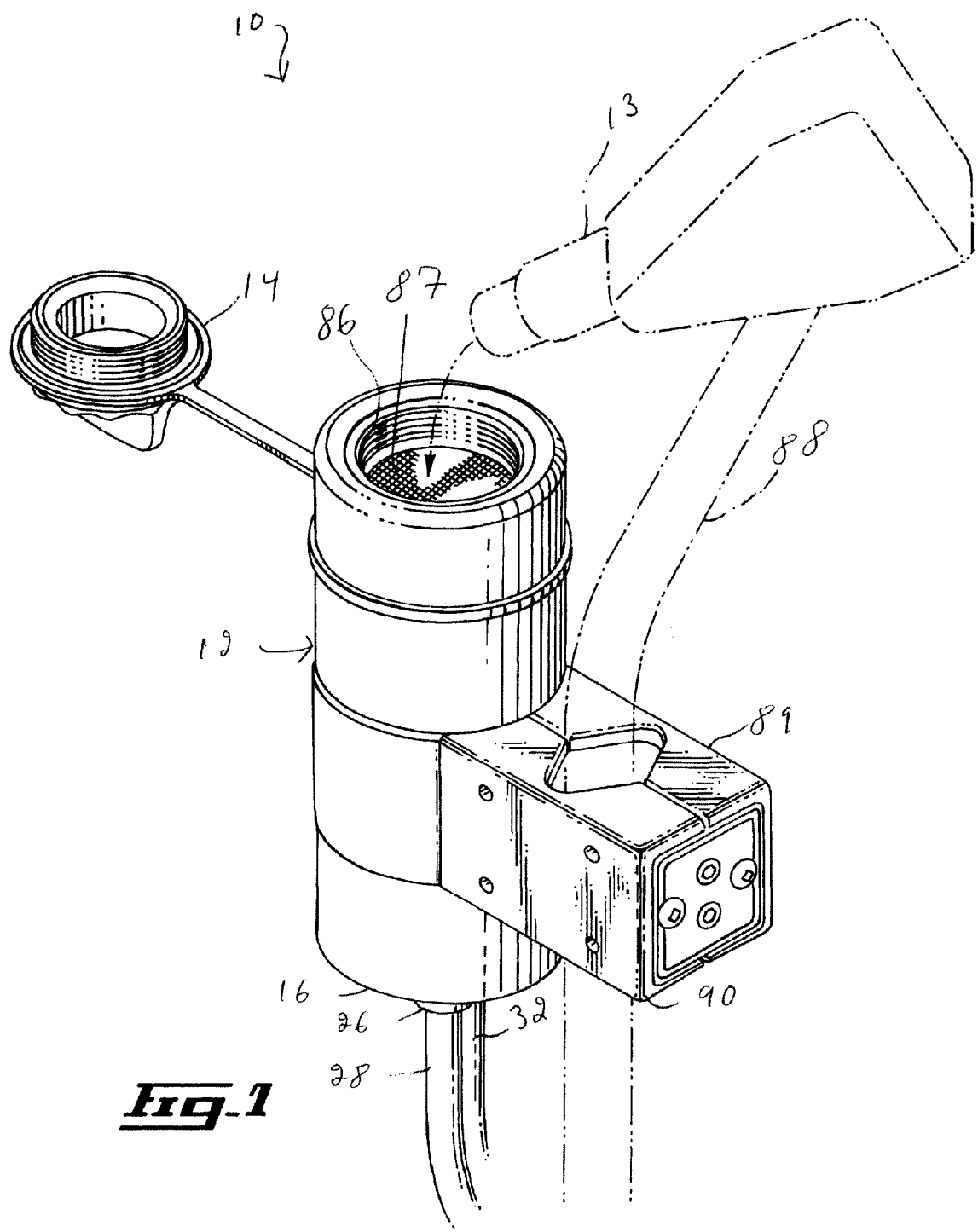
FIG. 1: is a perspective view of one embodiment of a liquid distributor according to the present invention, here shown mounted on a stationary support represented by an elongated generally vertical bar, drawn in phantom lines.
Figure 2:
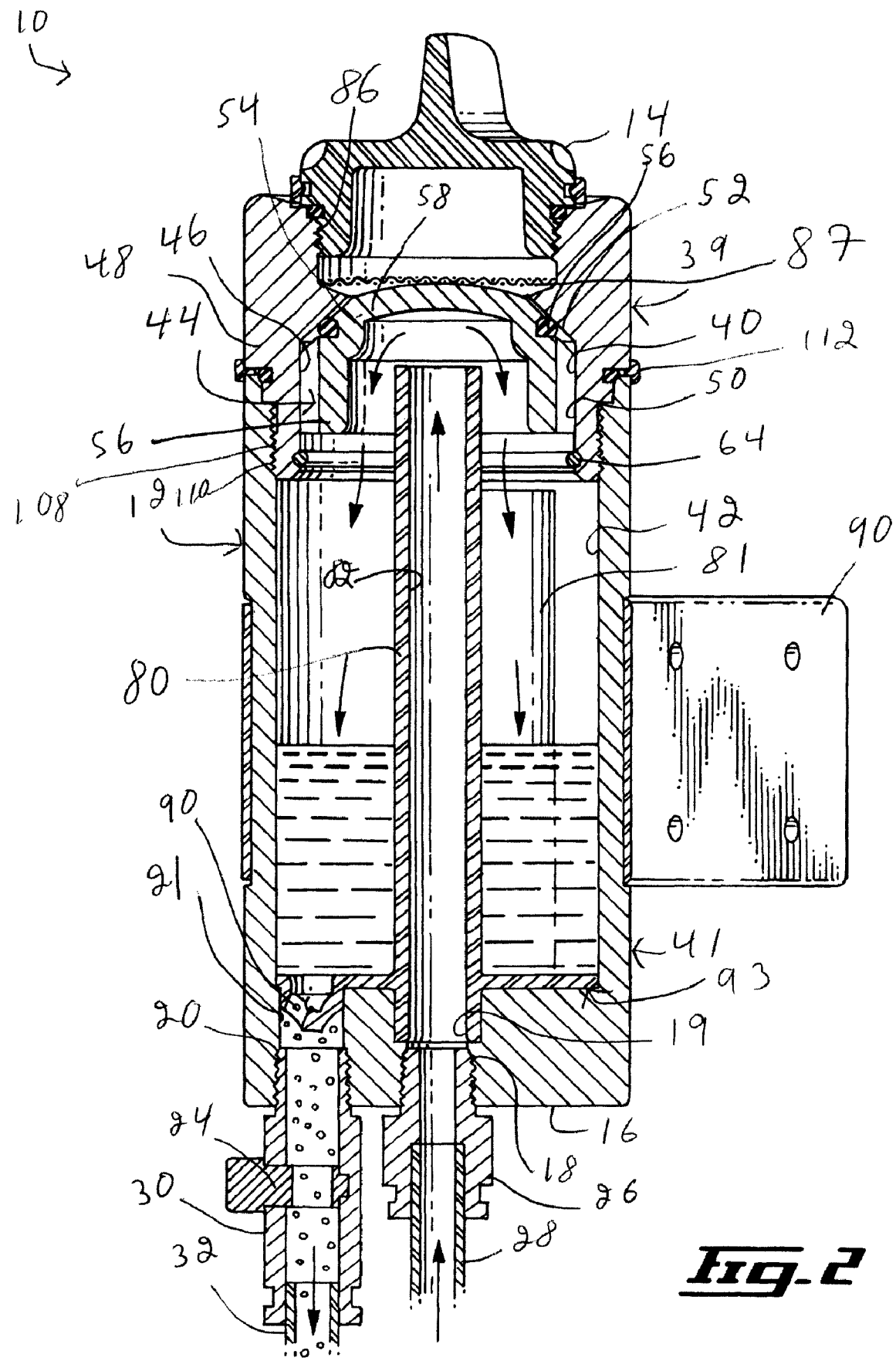
FIG. 2: is a side cross-sectional view of the liquid distributor of FIG. 1.

FIGS. 1 to 4 show various aspects of an embodiment of a maintenance liquid distributor for fluid pressure systems according to the present invention, and hereinafter simply abbreviated as liquid distributor 10. As best illustrated in FIGS. 1 and 2, liquid distributor 10 is generally defined by a vertically standing cylindrical container 12, having a screw on cap 14 closing a top aperture 86, and a closed bottom end 16, through which is centrally disposed, along a substantially vertical axis, an inlet port 18 surrounded by outlet ports 20, as better seen in FIG. 4. However, in alternative embodiments of the invention, the container 12 has any other suitable geometrical configuration.

Figure 3:
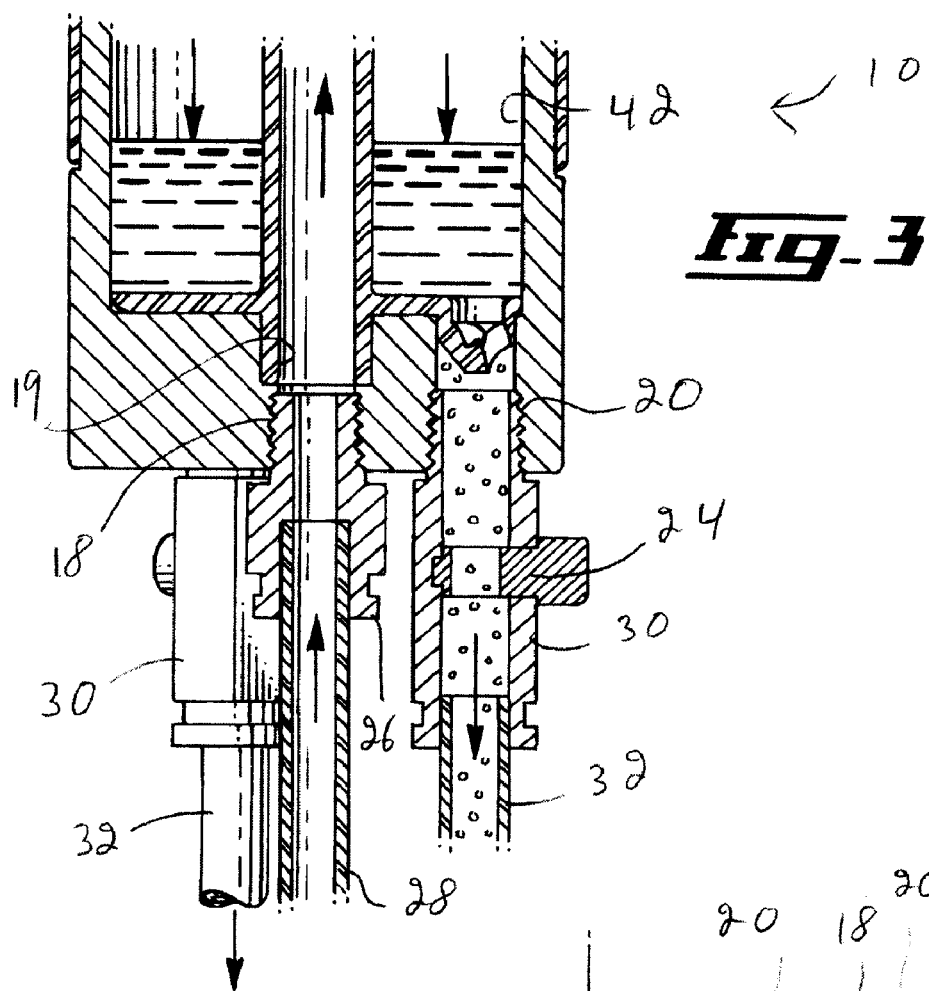
FIG. 3: is a partial side cross-sectional view of the liquid distributor of FIG. 1.
Figure 4:
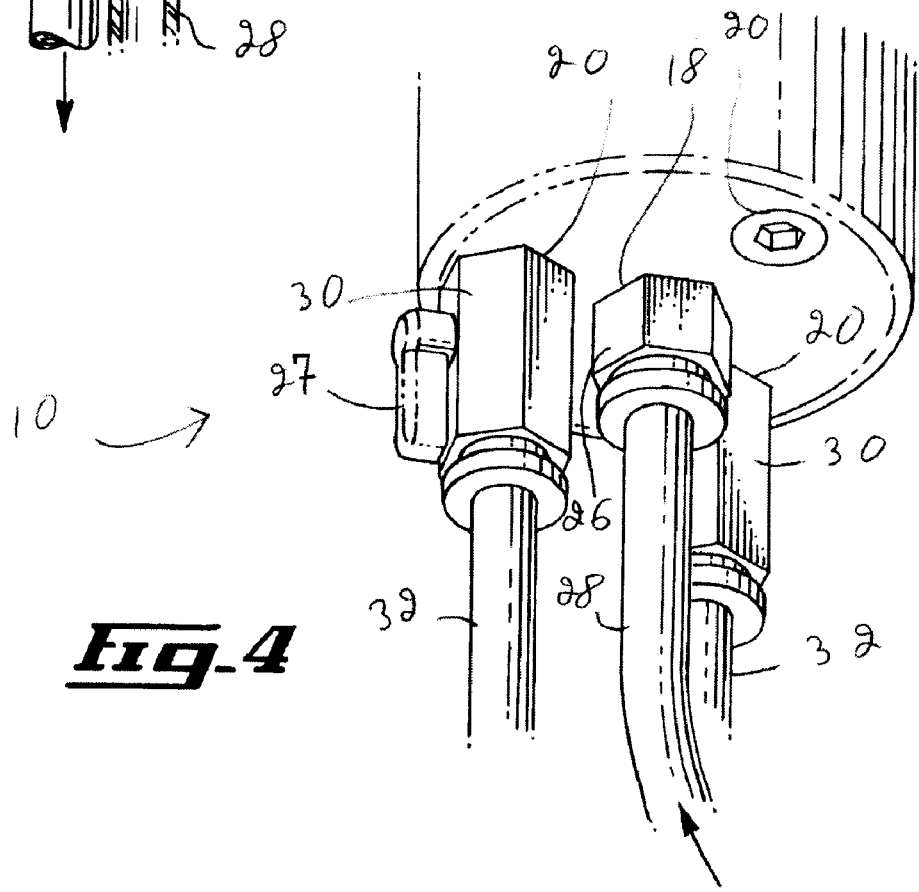
FIG. 4: is an alternative and partial perspective view of the liquid distributor of FIG. 1.

As better seen in FIGS. 3 and 4, inlet port 18 and outlet ports 20 include for example screw-threaded pipe connections for receiving, respectively, the end connectors 26 associated with an inlet line 28, and end connectors 30 associated with outlet lines 32. In some embodiments of the invention, the end connectors 30 associated with the outlet lines 32 are equipped with an outlet port valve 24, seen for example in FIG. 3, for example a plug type valve activated by a conventional thumb lever 27, seen for example in FIG. 4. The outlet port valve 24 is therefore operatively coupled to the outlet port 20 for selectively allowing and preventing fluid communication between the outlet line 32 and an internal portion of the cylindrical container 12 into which the outlet port 20 leads. Optionally, the end connector 26 can also include a valve (not shown in the drawings).

It is to be noted that quick connect type couplers, or any other types of couplers, can as well be used in place of screw-threaded connections between the end connectors 26 and 30 and the inlet and outlet lines 28 and 32. The number of outlet ports 20 may depend on the maximum number of corresponding outlet lines 32 required to be treated with a maintenance liquid. For example, on a tractor trailer, typical outlet lines 32 to be treated with maintenance liquid may be associated with an air brake, an air dryer and/or an air reservoir system. The outlet port valves 24 allow a selection among the outlet lines 32 to be treated with the maintenance liquid. Moreover, the multiple outlet ports 20 thus equipped with individual outlet port valve 24 can be advantageously used to selectively distribute a specific type of maintenance liquid to portions of a fluid pressure system to which it is exclusively applicable. However, in alternative embodiments of the invention, the liquid distributor 10 includes only one output port 20.

As best shown in FIG. 2, cylindrical container 12 is divided in a first container 39 defining a first chamber 40 and, a second container 41 defining a second chamber 42. The inlet and outlet ports 18 and 20 are in fluid communication with the second chamber 42 and the aperture 86 leads into the first chamber 40. The first chamber 40 is typically smaller than the second chamber 42.

A check valve 44 is provided between the first and second chambers 40 and 42. The check valve 44 is operable between an open configuration in which the first and second chambers 40 and 42 are in fluid communication with each other and a closed configuration in which the first and second chambers 40 and 42 are substantially hermetically sealed from each other. The check valve 44 achieves the closed configuration when a pressure inside the second chamber 42 is larger than a pressure inside the first chamber 40 by a predetermined pressure differential.

Typically, when the liquid distributor 10 is in an operative configuration, the liquid distributor 10 is positioned such that the second chamber 42 is located substantially below the first chamber 40. This embodiment allows for the use of a relatively simple to manufacture and robust check valve 44 that is substantially freely movable between the open and closed configurations. For example, the first and second chambers 40 and 42 are communicating through the check valve 44 which is rigidly fixed inside a through-hole 46 provided in a dividing wall 48 between the first and second chambers 40 and 42.

This configuration creates a liquid distributor 10 in which the predetermined pressure differential is substantially equal to zero in that only the relatively small weight of a plunger 54 of the check valve 44 needs to be moved by a pressure build up within the second chamber 42 to bring the check valve 44 to the closed configuration. However, in alternative embodiments of the invention, the first and second chambers 40 and 42 are oriented in any other suitable manner relatively to each other. In some of these embodiments, the check valve 44 is biased towards the open configuration, for example using a biasing element in the form of a coil spring positioned in a conventional manner for such purposes (not shown in the drawings).

Although check valves are common in the prior art, the present implementation of the check valve 44 will be explained in greater details for clarity. FIG. 2 best shows that the check valve 44 generally comprises a plunger 54 mounted in the through-hole 46. The through-hole 46 defines a generally cylindrical portion 50 and conically-tapered upper end 52. Plunger 54 is hollow and has a substantially cylindrically-shaped plunger lower portion 56, topped with elongated generally dome-shaped plunger upper portion 58. Furthermore, plunger 54 is free to move along the vertical, longitudinal axis of the through-hole 46 between a lower limit, represented by a retaining ring 64 half embedded in a circular recess around the inner peripheral wall of cylindrical portion 50, and the conically-tapered upper end 52 of the latter. It is to be noted that only a relatively small freedom of movement is required to the plunger 54 inside the through-hole 46. For example, between 1 and 10 mm of freedom may be amply sufficient to let a maintenance fluid to flow from the first chamber 40 to the second chamber 42.

The hermetical tightness of plunger 54, when pressed against the conically-tapered upper end 52, is secured by an O-ring seal 66, preferably made of rubber, which is half-embedded in a circular recess around the base of the plunger upper portion 58.

FIG. 2 shows that in some embodiments of the invention, the inlet port 18 is located substantially opposed to the check valve 44 and that an elongated tubular member 80 defining an inner bore 82 is extending from the inlet port 18 and into the second chamber 42 towards the check valve 44. More specifically, the elongated tubular member 80 is centrally projecting upwardly from the inlet port 18 on the inner bottom end of the second chamber 42 and the inner bore 82 is in fluid communication with both the second chamber 42 and the inlet port 18.

In some embodiments of the invention, an auxiliary tubular member 81 also projected generally upwardly from one of the outlet ports 20 substantially adjacent to the elongated tubular member 80. The auxiliary tubular member 81 is typically shorter than the elongated tubular member 80 and projects radially over a smaller distance than the plunger 54 to allow the creation of an outlet port 20 towards which the maintenance liquid does not flow directly to.

The inner bore 82 has smaller inner diameter relative to the inner diameter of the through-hole 46, as well as a suitable length for reaching a relatively higher level than the maximum upper level that would normally reach the maintenance liquid when the content of the first chamber 40 is totally transferred into the second chamber 42. Hence, a maintenance liquid contained in second chamber 42 is prevented from dribbling into the inlet port 18 through the top end of elongated tubular member 80 when the maintenance liquid flows into the second chamber 42 through the overhanging check valve 44, or when the maximum specified amount of maintenance liquid that may contain the first chamber 40 is cumulating within the second chamber 42 due, for example, to closed or blocked outlet ports 20.

It is to be noted that in some embodiments of the invention, the inner diameter of the inlet port 18 and, consequently, the inner diameter of the inner bore 82, can be appropriately oversized relative to the inner diameter of the outlet ports 20 such that the amount of pressurized fluid entering the second chamber 42 through fluid inlet port 18 is sufficient to supply all the outlet ports 20 at once. More generally, in cases in which the inlet and outlet ports 18 and 20 are not necessarily cylindrical, the inlet and outlet ports 18 and 20 define respectively inlet and outlet passageways 19 and 21, the inlet, and outlet passageways 19 and 21 each leading into the second chamber 42, the inlet passageway 19 having a larger lateral cross-sectional area than any of the outlet passageways 21. In other words, the inlet and outlet ports define respectively inlet and outlet hydraulic resistances, the inlet resistance being substantially smaller than any of the outlet hydraulic resistances.

In operation, when a pressurized fluid is projected upwardly through elongated tubular member 80, the rapidly rising fluid pressure inside second chamber 42 forces the mobile plunger 54 to immediately rise up against the seat created by the overhanging conically-tapered upper end 52, hence forming a positive seal between the pressurized second chamber 42 and the non-pressurized first chamber 40. When the fluid pressure in the lower chamber is released through one or more of the outlet ports 20, the lower edge of plunger 54 comes resting down on the retaining ring 64. Hence, any residual maintenance liquid present in the first chamber 40 can trickle down through the space created between the conically-tapered upper end 52 and the plunger upper portion 58 to drip down into the second chamber 42.

In some embodiments of the invention, a pressure-release valve (not shown) is provided through the screw on cap 14 for releasing any fluid pressure build-up that may be cumulating inside the first chamber 40 during normal open and close operations of the check valve 44. The pressure release valve is therefore in fluid communication with the first chamber 40 when the cap 14 blocks the aperture 86. Furthermore, the size and shape of the screw on cap 14, as well as the inner diameter of the aperture 86 covered by the latter, which leads into the first chamber 40, are preferably of appropriate size and shape for allowing a user to easily open the cap 14 simply by hand and pour the content of a conventional pint-sized container 13, shown in phantom lines in FIG. 1, of maintenance liquid into the aperture 86 of the first chamber 40 without requiring any additional tool such as a funnel. For example, the aperture 86 may have a diameter of between 2.5 cm and 12.5 cm (roughly between 1 and 5 inches).

In some embodiments of the invention, as seen in FIGS. 1 and 2, a filter, for example a mesh grid filter 87 extends across the first chamber 40 at a location between the check valve 44 and the aperture 86. The filter 87 prevents the insertion in the liquid distributor 10 of solid particles that could damage the pressurized fluid system.

As best shown in FIG. 1, liquid distributor 10 is preferably mounted to a stationary distributor mount 88 through a mounting bracket, for example including clamps 89 that are mechanically coupled to the first and second containers 40 and 42 by projecting laterally from the main container 12 and rigidly fixed around a substantially vertical distributor mount 88 (as best shown in FIG. 1). For example, in a typical application such a tractor trailer equipped with liquid distributor 10, a vertical support member 88 could be best represented by a hand rail member commonly found on the exterior walls of the tractor cabin or the trailer or by a vertical hand rail, or the like, located inside the comfort of the cabin of the tractor since one of the most likely usage of the liquid distributor 10 is for de-icing an air brake system during the cold winter months. However, it would also be within the scope of the present invention to have the liquid distributor 10 defined as a portable unit having, for example, a side handle, a fastening magnet, a fastening suction cup, or the like, instead of clamps 89.

A typical air brake system on a tractor trailer may require, for example, a liquid distributor 10 capable of containing about 250 ml (8.4 fld. ounces). Although liquid distributor 10 is defined as having a substantially cylindrical shape generally sized to contain a volume of about 250 ml of maintenance liquid, it can as well have any other shape and size adapted to suit any particular fluid pressure system applications. Furthermore, liquid distributor 10 is preferably constructed from high strength plastic and/or metal capable of safely withstanding the nominal pressure required for the intended fluid pressure system. For example, a typical air brake system on a tractor trailer can require a liquid distributor 10 capable of withstanding an internal pressure of at least 170 P.S.I. The nature of the maintenance liquid used in the liquid distributor 10 may be typically an alcohol based liquid for thawing and removing any accumulated ice deposits, particularly in air brake systems, or any other applicable conditioning liquids for the maintenance of fluid pressurized systems in general.

In some embodiments of the invention, as seen for example in FIG. 4, the outlet ports 20 each defines an atomizer 90 for atomizing liquids flowing therethrough so as to facilitate circulation of the maintenance liquid through the pressurized liquid system.

FIG. 6 illustrates a variant in which the cap 14 is omitted from the liquid distributor 10'. Instead, the top wall of the first container 39 defines auxiliary ports 92 and 94 connectable respectively to a feeding and a return tube 96 and 98. The feeding and return tubes 96 and 98 each extend between a liquid tank 100 used for containing a relatively large quantity of the maintenance liquid and the first container 39 and allow fluid communication therebetween. A pump 102, for example powered by a battery 104, is operatively coupled to the liquid tank 100 and to the feeding tube 96 for selectively moving the maintenance liquid from the liquid tank 100 to the first chamber 40 through the feeding tube 96 in a conventional manner.

A controller 106 is operatively coupled to the pump 102 for selectively activating and deactivating the pump 102. For example, the controller 106 allows for supplying the maintenance fluid to the first chamber 40 at predetermined time intervals, upon manual activation by an operator or according to a predetermined activation criterion, such as, for example, the detection of a temperature below which ice may cause problems in the fluid pressurized systems, among other possibilities.

As seen in FIG. 2, in some embodiments of the invention, the second container 41 is manufactured separately from the first container 39 and is provided with inner threads 108 in its upper section. The inner threads 108 engage corresponding outer threads 110 provided in the lower section of the first container 39 when assembly of the main container 12 is performed, typically with an O-ring seal 112 provided between the first and second containers 39 and 41. Also, the atomizers 90, elongated tubular member 80 and auxiliary tubular member 81 are typically all attached to a base 91, as seen in FIGS. 7-9, and insertable in the second chamber 42 as a single unit 93.

Although the present invention has been described hereinabove by way of preferred embodiments thereof, it can be modified, without departing from the spirit and nature of the subject invention as defined in the appended claims.

What is claimed is:

1. A liquid distributor for distributing a liquid in a pressurized system, said pressurized system including an inlet line and a first outlet line for respectively supplying a pressurized fluid to said liquid distributor and receiving said pressurized fluid from said liquid distributor, said liquid distributor comprising:
    a first container, said first container defining a first chamber and an aperture leading into said first chamber;
    a second container, said second container defining a second chamber, an inlet port connectable to said inlet line and a first outlet port connectable to said first outlet line, said inlet and first outlet ports both being in fluid communication with said second chamber; and
    a check valve provided between said first and second chambers, said check valve being operable between an open configuration in which said first and second chambers are in fluid communication with each other and a closed configuration in which said first and second chambers are substantially hermetically sealed from each other, said check valve achieving said closed configuration when a pressure inside said second chamber is larger than a pressure inside said first chamber by a predetermined pressure differential.

2. A liquid distributor as defined in claim 1, wherein said check valve is substantially freely movable between said open and closed configurations.

3. A liquid distributor as defined in claim 2, wherein said predetermined pressure differential is substantially equal to zero.

4. A liquid distributor as defined in claim 2, wherein, when said liquid distributor is in an operative configuration, said liquid distributor is positioned such that said second chamber is located substantially below said first chamber.

5. A liquid distributor as defined in claim 1, further comprising a first outlet port valve operatively coupled to said first outlet port for selectively allowing and preventing fluid communication between said first outlet line and said second chamber.

6. A liquid distributor as defined in claim 5, wherein said pressurized system further includes a second outlet line for receiving said pressurized fluid from said liquid distributor, said second container defining a second outlet port connectable to said second outlet line, said second outlet port being in fluid communication with said second chamber.

7. A liquid distributor as defined in claim 6, wherein said inlet port, first outlet port and second outlet port define respectively an inlet passageway, a first outlet passageway and a second outlet passageway, said inlet, first outlet and second outlet passageways each leading into said second chamber, said inlet passageway having a larger lateral cross-sectional area than either one of said first and second outlet passageways.

8. A liquid distributor as defined in claim 6, wherein said inlet, first outlet and second outlet ports define respectively an inlet, a first outlet and a second outlet hydraulic resistance, said inlet resistance being substantially smaller than either one of said first and second outlet hydraulic resistances.

9. A liquid distributor as defined in claim 1, wherein said inlet port is located substantially opposed to said check valve.

10. A liquid distributor as defined in claim 9, further comprising a tubular member extending from said inlet port and into said second chamber towards said check valve.

11. A liquid distributor as defined in claim 1, further comprising a cap for selectively covering said aperture.

12. A liquid distributor as defined in claim 1, further comprising a filter extending across said first chamber at a location between said check valve and said aperture.

13. A liquid distributor as defined in claim 1, wherein said liquid distributor is mountable to a distributor mount, said liquid distributor further comprising a mounting bracket mechanically coupled to said first and second containers for mounting said liquid distributor to said distributor mount.

14. A liquid distributor as defined in claim 1, wherein said first outlet port defines an atomizer for atomizing liquids flowing therethrough.

15. A liquid distributor as defined in claim 1, further comprising:
a liquid tank for containing said liquid;
a feeding tube extending between said liquid tank and said first container for allowing fluid communication between said liquid tank and said first chamber;
a pump operatively coupled to said liquid tank and to said feeding tube for selectively moving said liquid from said liquid tank to said first chamber through said feeding tube.

* * * * *